United States Patent

Smith, Sr.

[15] 3,664,462
[45] May 23, 1972

[54] LUBRICANT METERING VALVE

[72] Inventor: William O. Smith, Sr., 2806 Amsterdam Road, Ludlow, Ky. 41016

[22] Filed: May 27, 1970

[21] Appl. No.: 40,878

[52] U.S. Cl. ..................................184/7 D, 184/29, 222/249, 222/335
[51] Int. Cl. .........................................F16n 23/00
[58] Field of Search.........................184/7, 7 D, 7 E, 7 F, 29; 222/335 X, 249 X; 137/625, 625.11, 625.46

[56] References Cited

UNITED STATES PATENTS

| | | | |
|---|---|---|---|
| 2,627,320 | 2/1953 | Rotter | 184/7 D |
| 2,626,014 | 1/1953 | Schmid | 184/7 D |
| 3,145,803 | 8/1964 | Cobert | 184/7 D |
| 2,699,842 | 1/1955 | Juettner | 184/7 E |
| 3,253,678 | 5/1966 | Osmond | 184/7 D |
| 3,487,892 | 1/1970 | Kiefer | 184/7 |
| 3,038,557 | 6/1962 | Callahan | 184/7 D |
| 1,968,000 | 7/1934 | Wupper | 184/7 D |

Primary Examiner—Manuel A. Antonakas
Attorney—Wood, Herron & Evans

[57] ABSTRACT

A self-contained metering valve for a centralized lubrication system in which the metering valve comprises a valve body having a longitudinal bore, an input passageway leading to one end of the bore, and a normally closed one-way valve assembly comprising a check valve sleeve and spring-biased piston disposed adjacent the input passageway. The bore of the valve body further includes a spring-biased main discharge piston located above the check piston, together with transfer passageways leading from the one-way valve assembly to the opposite sides of the spring-biased discharge piston.

The arrangement is such that the lubrication system supplies timed surges of high pressure lubricant, forcing the check piston open and permitting lubricant to pass to the lower end of the main discharge piston, thus forcing the piston upwardly. The bore above the main piston comprises a metering chamber which dispenses a metered quantity of lubricant through an output passageway to a bearing as the piston is forced upwardly. When the pressure in the system drops to zero, then the check piston is closed by its biasing spring, blocking the inlet passageway and opening the transfer passageway to transfer lubricant from the pressure chamber below the piston to the metering chamber above the piston so as to condition the valve for the next cycle.

9 Claims, 17 Drawing Figures

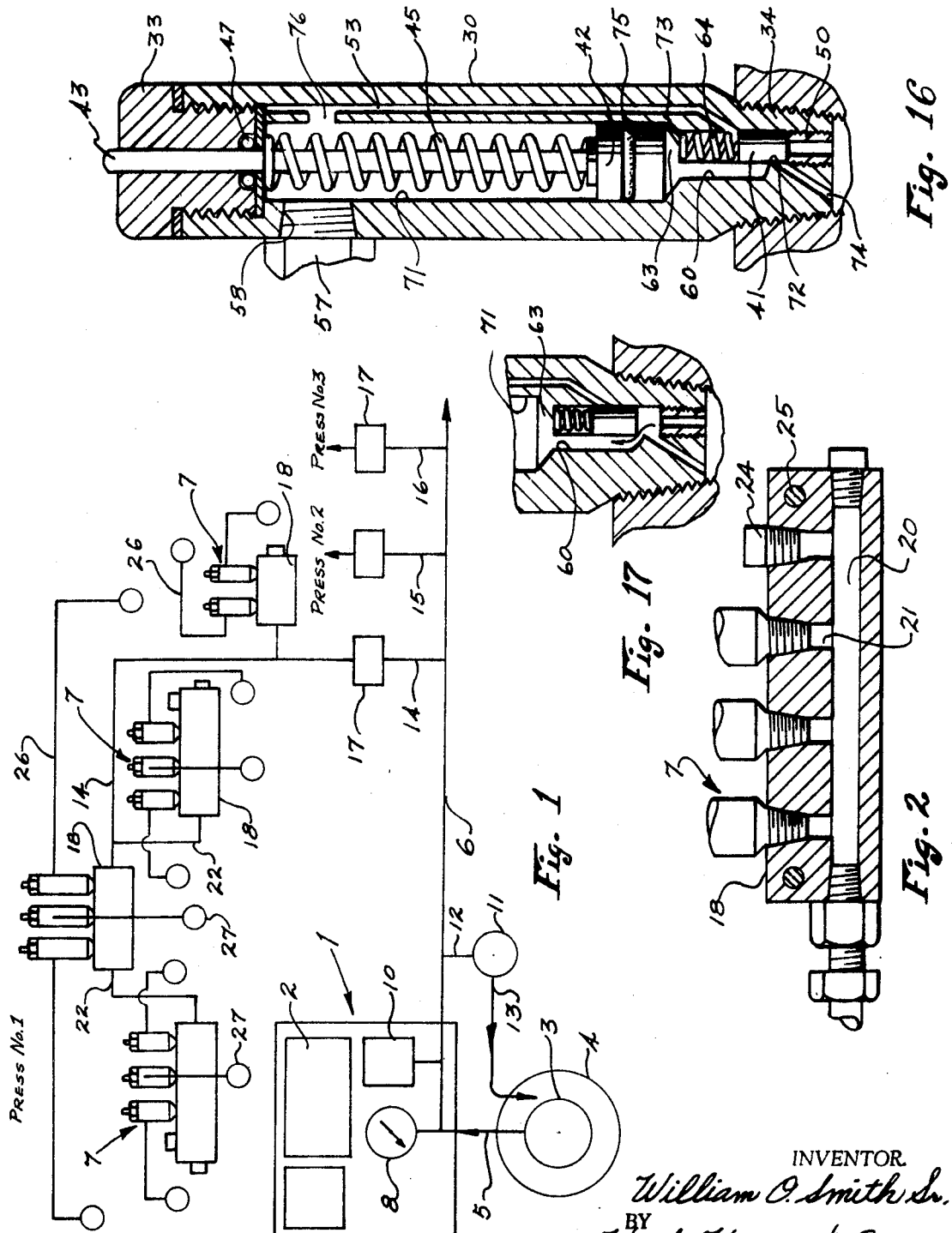

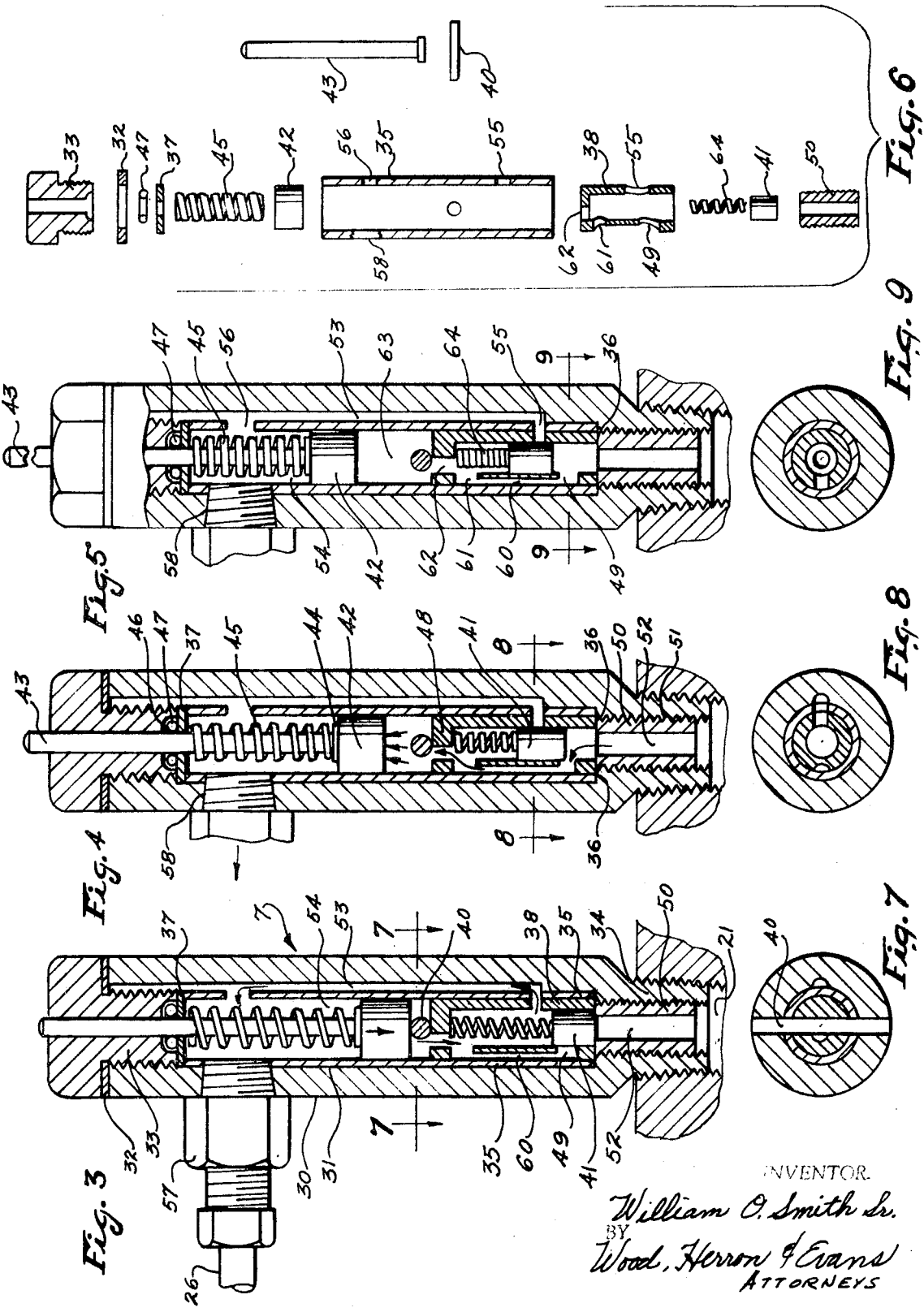

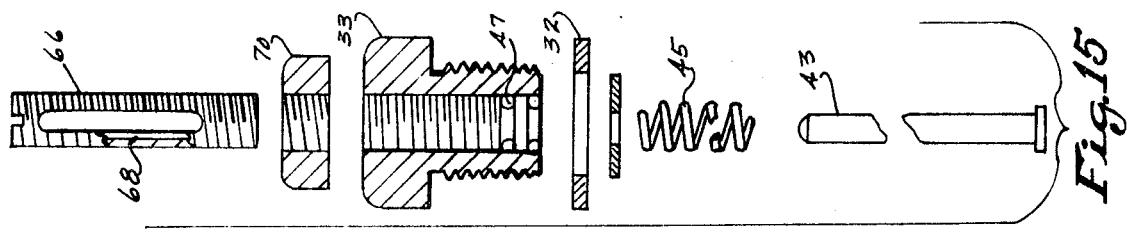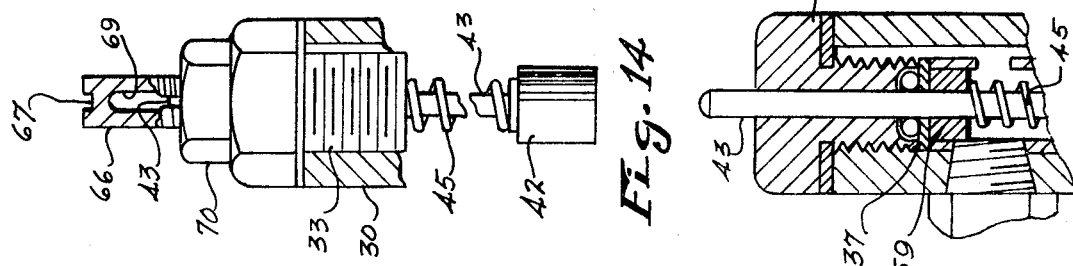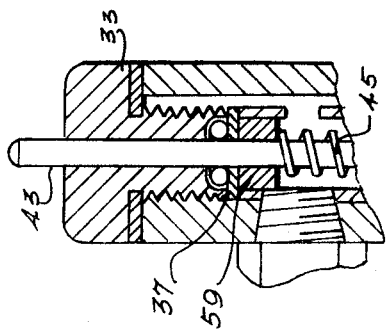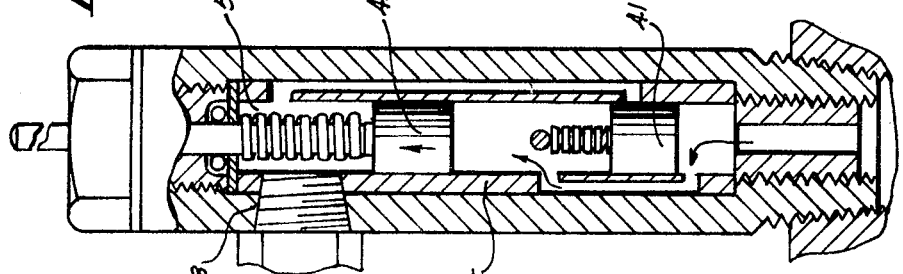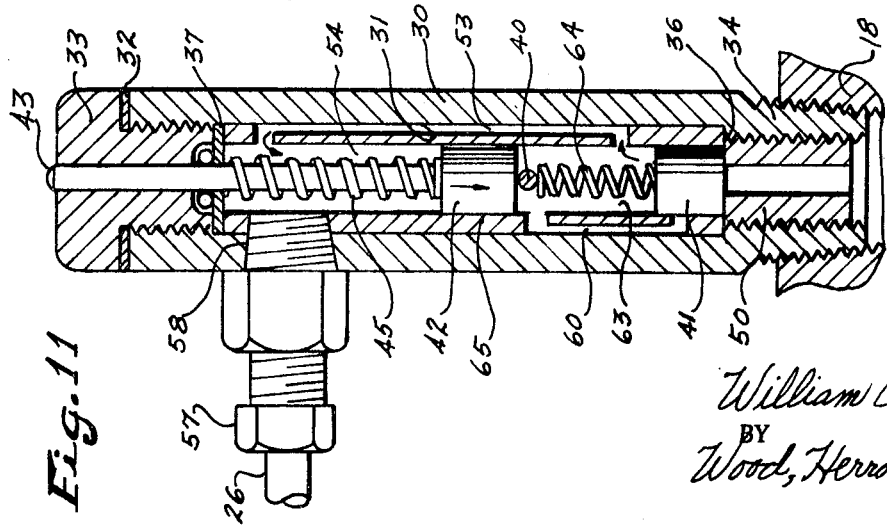

LUBRICANT METERING VALVE

BACKGROUND OF THE INVENTION

Metering or regulating valves incorporated in an automatic lubrication system, have been extensively used in the past. One of the major advantages of such a system arises from the fact that lubricant is dispensed in an automatic manner from a centralized point and is fed through a distributing system or network of tubes leading to the bearings to be lubricated. In this manner, one machine having a plurality of bearing points or an entire battery of machines may be lubricated at a fixed period.

Lubrication systems of this type usually include some type of measuring or control valve which regulates the amount of lubricant to be supplied during each lubrication cycle. The control valves embodied in systems of this type in the past have been complex in design and construction and therefore expensive to manufacture. Moreover, the valves supplied in the past have not been designed to inject the lubricant directly into each bearing and have not been susceptible to exact regulation, with the result that some of the bearings of a machine may be over-lubricated while other bearings may not receive sufficient lubrication.

One of the primary objectives of the invention has been to provide a metering valve which provides positive displacement of lubricant and which is incorporated in a centralized lubrication system for injecting under predetermined pressure a metered quantity of lubricant directly into the bearing upon each cycle of operation of the system.

According to this concept, the metering valve essentially comprises a valve body having a longitudinal bore including an inlet passageway at one end having a one-way valve consisting of a cylinder and a spring-biased check piston to control the flow of lubricant. The bore includes a spring-biased main discharge piston located above the check piston and an output passageway located above the main piston.

The arrangement is such that when pressure is introduced into the inlet end, the check piston is shifted upwardly so as to open a check valve transfer passageway which permits lubricant to pass into the pressure chamber below the main discharge piston, thereby to shift the piston upwardly against its spring. The space within the valve body above the piston may be considered a metering chamber which communicates with the output passageway so that, as the main piston moves upwardly under lubricant pressure, a previously metered charge of lubricant is injected under pressure through the output passageway into the bearing.

The valve further includes metering chamber transfer passageway extending from the check valve to the metering chamber above the main piston. The arrangement is such that after the metered charge is forced into the bearing, the piston returns downwardly under influence of its spring and a new charge of lubricant flows from the pressure chamber below the piston, upwardly through the metering transfer passageway and into the metering chamber above the piston, ready for the next cycle of operation.

Another objective of the invention has been to provide a metering valve in which the output capacity of the valve may be selected in accordance with the volumetric lubrication requirements of various bearings in a given machine, the valves of the different capacities being utilized in the centralized lubrication system and operable independently of one another to dispense the required quantity of lubricant to each bearing.

According to this aspect of the invention, the valves may be fabricated in several sizes from maximum to minimum capacity to suit the various bearings of a machine or series of machines. On the other hand, the stroke of the main discharge piston may be shortened by utilizing a spacer in conjunction with the piston spring to control the amplitude of the piston stroke and thereby control the output capacity. It is also contemplated to provide an external adjustment means, whereby the stroke of the main valve piston may be regulated to provide the desired output capacity.

The metering valve is particularly suited for supplying metered charges of lubricant to the several bearings of one machine or to the bearings of a battery of machines in response to surges of lubricant pressure developed in a centralized lubrication system including a lubricant pump which operates at timed intervals. The arrangement is such that the several valves of the system operate independently of one another, as distinguished from sequentially, to deliver their specific charge of lubricant to the bearing with which each particular valve is connected. Accordingly, the lubrication system will continue to feed lubricant until the last valve of the series, whether of large or small capacity, has discharged its metered charge, at which point, back pressure will build up in the system, causing it to bypass, so that pressure in the system drops to zero. At this point, the valves return to a starting position, ready to deliver the metered charges of lubricant to the bearings during the next pressure surge. The metering valves include indicator stems projecting upwardly from the main discharge piston and through a closure plug at the upper end of the valve to provide a visual indication of valve operation.

A further objective has been to provide a metering valve of exceptionally simple construction, the components of which may be fabricated from standard stock sizes by simple machining operations and assembled without special tools, thereby to reduce the cost of each valve.

According to this concept, the valve body may be fabricated from standard bar or hexagonal stock having a main cylinder sleeve consisting of steel tubing closely fitted within the valve body. The cylinder sleeve includes lateral ports machined within it, and the bore of the valve body includes a longitudinal slot so that the cylinder sleeve, upon being forced in place, delineates the longitudinal metering chamber transfer passageway to eliminate expensive machining operations.

The check or one-way valve assembly may comprise a check cylinder sleeve, also formed from standard stock, closely fitted in the lower end portion of the main cylinder sleeve and having a spring-loaded check piston slidable within it. The check cylinder sleeve includes a longitudinal slot, closed off by the cylinder sleeve and forming the check valve transfer passageway for passing lubricant from the intake end of the metering valve to the pressure chamber beneath the piston.

In a small capacity valve, the main cylinder sleeve may also incorporate the valve sleeve as a one-piece unit to further simplify the structure. In this case the cylinder sleeve is machined externally to delineate the metering and check valve transfer passageways. In both examples, the valve is assembled by slipping the components into the upper end of the valve body, then applying a closure plug to the upper end to clamp the components firmly against a shoulder formed at the lower intake end of the valve body.

The various features and advantages of the invention will be more fully apparent from the following description in conjunction with the drawings.

DRAWINGS

FIG. 1 is a diagrammatic view of a typical centralized lubrication system for distributing lubrication to a plurality of metering valves of the present invention.

FIG. 2 is a sectional view of one of the manifolds which are interconnected in the conduits of the control system for distributing lubricant to the groups of metering valves which are threaded into the manifold.

FIG. 3 is an enlarged sectional view of one of the metering valves with the spring loaded discharge piston and spring loaded check piston both in their lowered positions, with the pressure in the lubrication system at zero pressure.

FIG. 4 is a sectional view similar to FIG. 3, showing the movement of the spring loaded check valve piston and main discharge piston as lubricant pressure is transmitted to the input end of the metering valve, with lubricant being discharged from the metering chamber above the main piston.

FIG. 5 is a view similar to FIG. 4, showing the main discharge piston at its upper limit of travel with its biasing spring compressed to a solid length.

FIG. 6 is an exploded view detailing the several internal parts of the metering valve.

FIG. 7 is a cross-sectional view taken along the line 7—7 of FIG. 3 showing the main valve body, the main cylinder sleeve, metering transfer passageway, and the retainer pin.

FIG. 8 is a sectional view taken along the line 8—8 of FIG. 4 showing the check cylinder sleeve, the check transfer passageway, and the lateral port leading to the metering transfer passageway.

FIG. 9 is a cross-sectional view taken along the line 9—9 of FIG. 5, further illustrating the check cylinder sleeve and its lateral port leading to the check transfer passageway.

FIG. 10 is a fragmentary sectional view similar to FIG. 5 illustrating a modified arrangement wherein a spacer sleeve is interposed between the upper end of the main piston spring and closure plug to reduce the stroke of the main discharge piston, thereby to decrease the output capacity of the metering valve.

FIG. 11 is an enlarged longitudinal sectional view similar to FIG. 3, illustrating another modified arrangement wherein the valve is constructed with a one-piece cylinder sleeve which combines both the check cylinder and main cylinder.

FIG. 12 is a view similar to FIG. 11, showing the check piston and main discharge piston moving upwardly to discharge the metered lubricant during the pressure surge of the system.

FIG. 13 is a sectional view further illustrating the one-piece cylinder and check sleeve of the valve shown in FIGS. 11 and 12.

FIG. 14 discloses another modification in which there is provided an external adjustment device arranged to engage the upper end of the indicator stem to regulate the output capacity of the metering valve.

FIG. 15 is an exploded view showing the several components of the externally adjustable metering valve of FIG. 14.

FIG. 16 is a longitudinal sectional view illustrating a metering valve which operates along the same principles as previously disclosed with the exception that the design has been simplified by omitting the main cylinder sleeve and check valve cylinder.

FIG. 17 is a fragmentary sectional view taken from FIG. 16, showing the operation of the modified valve structure.

LUBRICATION SYSTEM

The typical automatic lubrication system, illustrated diagrammatically in FIG. 1, has been selected to disclose the operating principles of the metering valve. The system is a commercial type and the structural details have been omitted since they are unnecessary for an understanding of the invention. It will be understood that the devices which control the timing of pump operation, the lubricant pressure transmitted to the valves, and other factors are electrically operated. The main lubricant delivery pump may be of any well known air-operated type although in some instances an electrical pump may be desirable.

Referring to FIG. 1, the control box, indicated generally at 1, represents a unit incorporating the various electrical components and including a control panel having visual indicating devices of the usual type. The control box 1 includes a cycle timer, indicated at 2, which in conjunction with the other components, times the cycles of pump operation, as explained later. The cycle timer 2, at predetermined time intervals (for example, once every 30 minutes) sends a signal to the electrical control system (not shown) which operates a lubricant pump 3 mounted preferably upon a grease drum or reservoir 4. The output of the pump is transmitted by way of a conduit or line 5 to the main supply line 6 which distributes the lubricant at high pressure (for example, a maximum pressure of 2,500 P. S. I.) to the several metering valves indicated generally at 7 of the lubrication system.

The line 5 leading from the pump 3 includes a pressure gage 8 which provides a visual indication of the pressure existing in the system at any given time. The main supply line 6 includes a pressure-responsive switch indicated at 10, which is arranged to regulate the maximum pressure in the system (main supply line 6). The pressure switch 10 is interconnected through the electrical system with a pressure release valve 11 connected to the line 12 which branches from main line 6. A return line 13 interconnects the pressure release valve with the lubricant reservoir 4.

By virtue of the interconnected pressure-responsive switch 10 and electrically operated pressure release valve 11, the valve 11 is opened when the predetermined pressure is developed in the main supply line 6 of the lubrication system. In practice, the pump may operate through several complete strokes, supplying lubricant to the several metering valves in accordance with the setting of the timer 2. When the predetermined maximum pressure builds up in the line, then the pressure-responsive switch 10 signals the pressure release valve 11 to open, thereby to relieve the pressure in line 6 so that the excess lubricant is bypassed through release valve 11 (conduits 12 and 13) back to the reservoir 4.

It will be understood that the lubrication system is intended to provide high pressure surges of lubricant through the system and the lubricant is distributed to multiple bearings of one machine or several machines in measured quantities by the metering valves 7 of this invention. As shown in FIG. 1, by way of example, the main conduit or line 6 is provided with several branch or distributing lines 14, 15 and 16, each of which distributes lubricant to the several bearings of three machines. In the example illustrated, the machines consist of punch presses as labelled on the diagram (FIG. 1). Each of the distributing lines 14, 15 and 16 is provided with an electrically operated shut-off valve 17. Each shut-off valve 17 is electrically interconnected with the control system for the machine with which it is associated, the arrangement being such that the valve is normally closed and opens only when the motor of the particular machine is energized.

Each distributing line 14, 15 and 16 is connected to respective lubricant manifolds 18 arranged to accommodate several of the metering valves 7. It will be understood that the manifolds are furnished in various sizes to accommodate one or a considerable number of metering valves.

As detailed in FIG. 2, a typical manifold 18 may be fabricated from bar stock having a longitudinal bore 20 and four transverse bores 21 communicating with the longitudinal bore 20, the bores 21 being tapped to a standard tapered pipe size. If the manifold is interposed in the distributing line 14, as illustrated in FIG. 1, then the line 14 is interconnected with both ends of the longitudinal bore 20 by means of pipe fittings. On the other hand, if the manifold is connected to one of the branch lines 22, then one end of the bore is connected to the branch line 22 and its opposite end is closed off by a standard tapered pipe plug 23 as illustrated in FIG. 2. If less than four distributing valves are utilized, then the unused transverse bore 21 is similarly blocked by a plug 24 (FIG. 2). Each manifold 18 may be attached to the machine which it serves by bolts 25 passing through opposite ends of the manifold into the machine.

As indicated in FIG. 2, the lower end of each metering valve 7 includes a tapered pipe fitting which is threaded into the transverse bores 21 of the manifold, such that the lubricant is introduced under pressure into the lower end of the metering valve or valves. Each metering valve 7 is provided with a fitting (not shown in FIG. 1) to which is connected a high pressure output line or conduit 26. Each conduit 26 leads to one of the bearings of the machine, which are indicated diagrammatically at 27 in FIG. 1.

It will be understood at this point, that the distributing lines 15 and 16 similarly extend to manifolds 18, the number of manifolds and number of metering valves depending upon the number of bearings to be lubricated. As explained later, the metering valves may be furnished in selective sizes to meter predetermined quantities of lubricant to the several bearings, as required by the design of the machine, or a given size valve may be modified or adjusted for this purpose.

OPERATION OF SYSTEM

The lubrication system disclosed in FIG. 1 furnishes successive high pressure surges of lubrication by way of the main supply line 6, distributing lines 14-16 and the several manifolds 18 to activate the metering valves 7. Each metering valve includes a reciprocating discharge piston (described later) which responds to the pressure surge to provide a one-shot metered output of lubricant, such as grease.

Briefly, the cycle timer 2 initiates a cycle of operation at predetermined intervals, as noted, so as to energize the high pressure pump 3. Upon being energized the pump operates through a number of strokes, depending upon the extent of the centralized lubrication system and the number of metering valves 7 of the system. As pressure builds up in main line 6 and in the metering valves 7 by way of the branch lines 14, 15 and 16 (the electrically operated shut-off valves 17 being open), the pressure acts upon the discharge pistons of the several metering valves, as explained later, causing the individual valves to forcibly discharge the previously metered amount of lubricant to the respective bearings 27. After the metering valve piston has been thus actuated, it encounters a positive stop so that back pressure is built up in the valve permitting no more lubricant to flow into it from the main supply line 6. The arrangement is such that the metering valves 7 may operate independently of one another until the discharge piston of all of the valves have reached their final discharge limit.

At this stage, back pressure begins to build up in the system so as to act upon the pressure switch 10 which is in communication with line 6. As noted, pressure switch 10 is electrically connected to the pressure release valve 11 to open valve 11 and thus permit back pressure from supply line 6 to flow through release valve 11 by way of branch lines 12 and 13 back to the reservoir to reduce the lubricant pressure in the supply line and branch lines to zero, thus ending the cycle.

At zero pressure, the main discharge pistons of the metering valves 7 are shifted back to their starting positions to displace lubricant from the lower side of the piston into the metering chamber above the piston, ready for the next cycle as controlled by cycle timer 2. The lubricant system will thereafter remain at rest until the cycle timer 10 initiates the next pressure surge to again pressurize the system and cause individual operation of the metering valves 7.

METERING VALVE

As noted, the metering valve, indicated at 7 in the diagram (FIG. 1), measures a predetermined quantity of lubricant when the pressure in the lubrication system drops to zero and dispenses the measured or metered quantity to the bearing during the pressure surge of the distributing network. The components of the metering or measuring valves, such as tubes, fittings, hexagonal and rod stock are of standard commercial sizes which may be cut or machined in order to serve their purpose. It will be understood that the output capacity of the valves 7 may be tailored to suit the lubricant requirements of several sizes and types of bearings of a given machine and that this may be accomplished by assembling valves of different volumetric capacity which can be used in the same system or network to supply relatively large or small quantities of lubricant. The valves also may be provided with means for adjusting the output capacity, as explained later.

Referring to FIGS. 3 - 5, which illustrate a preferred form, the valve selected to illustrate the principles of the invention, the valve may be of maximum capacity, comprising an elongated valve body or barrel 30 fabricated from standard bar stock which may either be cylindrical or hexagonal. The barrel 30 includes a longitudinal bore 31, the upper end portion of which includes a threaded bore to receive the threaded portion of a closure plug 33 having a washer 32 which seals off the upper end of bore 31. The lower end portion of barrel 30 is counterturned and threaded to provide a standard male pipe fitting 34 which is threaded into one of the transverse holes 21 of the manifold 18 to provide communication with the pressurized lubricant within the manifold.

A main cylinder sleeve 35, formed of standard steel tubing, is press fitted lightly into the longitudinal bore 31 of valve body 30. The lower end of sleeve 35 is seated against a shoulder 36 delineated by the lower end of the longitudinal bore 31. The upper end of the main cylinder sleeve 35 is engaged by a washer 37 which is seated against the lower end of the closure plug 33, the cylinder 31 thus being clamped in position within the longitudinal bore 31.

The lower end portion of the bore of cylinder sleeve 35, includes a check valve cylinder sleeve or thimble 38 which is also lightly pressed fitted into the cylinder sleeve 35. The check valve cylinder 38 is held in place within the bore of main cylinder 35 by a retainer pin 40 (FIGS. 3 and 7). For this purpose a cross bore is drilled through the valve body 30 and main cylinder 35 to receive retainer pin 40 which is press fitted in place. The pin 40 bears against the upper end of valve cylinder 38 to hold it downwardly in engagement with the shoulder 36 of longitudinal bore 31, as noted earlier with respect to the main cylinder 35. The retainer pin 40 also acts as a stop to limit the downward motion of the main piston 42. The main cylinder 35 and the check valve cylinder 38 are suitably ported, as described in detail later, to transfer lubricant from manifold 18 and to discharge the lubricant in metered quantities to the bearing to be lubricated by way of the output line 26 (FIG. 4).

The main cylinder 35 includes a discharge piston 42 which reciprocates within the bore of cylinder 35 during operation of the valve. An indicator stem 43 has a head 44 at its lower end seated against the upper surface of piston 42. A compression spring 45 is fitted upon stem 43 with its lower end seated against the head 44 of the stem and its upper end engaged against washer 37 which is seated upon the lower end of the closure plug 33. The compression spring is arranged to bias the piston in a downward direction as indicated by the arrow (FIG. 3). It will be noted that the upper end portion of stem 43 passes through the closure plug 33, the plug having a bore providing a sliding fit with the stem 43. The lower end portion of plug 33 is recessed as at 46, and a standard O-ring 47 is seated within the recess 36. The O-ring embraces the indicator stem 43 to provide a pressure seal between the stem 43 and plug 33.

The check valve cylinder sleeve 38 is in the form of a thimble having an outside diameter closely interfitting the inside diameter of the main cylinder sleeve 35 and having an end wall 48 at its upper end. The cylinder may be fabricated from standard bar stock with its bore machined to a predetermined depth to form the end wall 48 and provide the required stroke for the check valve piston 41. The lower end of the check valve cylinder 38 is flush with the end of main cylinder 35 and also seats against the shoulder 36 of valve body 30.

The lower end portion of the valve body which includes the male pipe fitting 34 also includes an inlet screw 50, which is threaded as at 51 into a straight bore formed in the valve body. The inlet screw 50 is also tubular so as to provide the inlet bore 52 leading to the check valve sleeve 38. The lower end of the inlet screw communicates with the manifold 18 so as to transmit lubricant under pressure to the bore of the check valve cylinder 38. It will be noted in FIG. 3, that the inlet bore 52 of screw 50 has a diameter which is smaller than the diameter of check piston 41 so that the upper end of the inlet screw forms a stop for check piston 41 in its lower position.

The valve body 30 includes a longitudinal metering transfer passageway 53 for transferring lubricant under pressure from the check valve assembly to the transfer chamber below the main piston 42 to the measuring chamber 54 above the piston during downward piston reciprocation (FIG. 3). For this purpose, the check valve cylinder sleeve 38 and main cylinder 35 include matching lateral ports 55 communicating with the longitudinal transfer passageway 53. The upper portion of the main cylinder sleeve 35 is provided with a similar lateral port 56 providing communication between the upper end of the transfer passageway 53 and the measuring chamber 54 above delivery piston 42. The lubricant which is trapped above main piston 42 in chamber 54 is discharged to the output line 26 upon upward motion of main piston 42, (FIG. 4).

The output line, previously indicated at 26, consists of standard tubing and is connected to the measuring chamber by standard outlet fitting 57. Fitting 57 includes a tapered pipe nipple which is threaded through the valve body 30 and through the main cylinder sleeve 35 to establish communication with the metering or displacement chamber 54. The lubricant is thus forced from the chamber through fitting 57 and tube 26 under high pressure during upward motion of piston 42 as indicated by the arrows in FIG. 4.

The valve shown in FIGS. 3 - 5 may represent one having a maximum capacity, for example, a piston stroke of approximately three-eighths of an inch and a maximum discharge capacity of 0.025 cubic inch per stroke. Valves arranged for smaller discharge capacities are shown in several modified structures as described later.

The check valve cylinder 38 in addition to the transfer port 55 includes a lateral port 49 in its lower portion. The lateral port 49 is located diametrically opposite the port 55. Port 55 communicates with a longitudinal check transfer passage 60 formed in the side of the valve cylinder by a machining or coining operation (FIGS. 4 and 8). The upper end of the longitudinal check transfer passage 60 communicates with a lateral port 61 immediately beneath the end wall 48 of the check valve cylinder. The end wall 48 includes a passageway 62 providing communication with the pressure chamber 63 below the main piston 42.

The check valve piston 41 is normally biased downwardly by a spring 64 in compression between the end wall 48 and the upper surface of the check piston 41, with the lower end of the piston seated against the threaded inlet screw 50 (FIG. 3). This is the normal position of the piston when the pressure in the lubrication system is at zero. The main discharge piston 42 also resides in its lower position against pin 40 by operation of its compression spring 45 at zero pressure.

METERING VALVE OPERATION

In general, the metering valve operates on the principle of transferring lubricant from the metering or displacement chamber 54 above main delivery piston 42 by way of lateral outlet fitting 57 and conduit 26 to the bearing 27. As noted, the chamber 54 contains a metered quantity of lubricant previously charged in the chamber by way of the longitudinal metering transfer passageway 53 during the downward stroke of the piston 42 (FIG. 3). The action of transferring the lubricant occurs when the pressure in the system drops to zero at the end of the cycle as described earlier with reference to the lubrication system.

When the cycle timer 2 times out to initiate the next cycle (for example 30 minutes later) pressure builds up in the manifold 18 and flows from the manifold by way of bore 52 of inlet fitting 50 to unseat check piston 41, which forms a one-way valve, as indicated in FIG. 4. As the lower surface of piston 41 passes above the lateral port 49, lubricant flows by way of the lateral port 49, longitudinal check valve transfer passageway 60 above valve piston 41 and through port 62 into the pressure chamber 63 below main delivery piston 42. It will be noted (FIGS. 4 and 8) that valve piston 41 now blocks off lateral port 55 so as to block back flow by way of longitudinal transfer passageway 53. Accordingly, pressure is developed in the pressure chamber 63 below main delivery piston 42, forcing the piston upwardly and displacing the previously metered quantity of lubricant from the metering chamber 54 outwardly through line 26 to the bearing 27. This action continues, in the present example, until the main piston spring 45 is compressed to its solid length (FIG. 5). The compression spring 45 thus acts as a positive stop between the piston 42 and washer 37 to limit the piston motion and the volume of lubricant which is discharged from the metering chamber 54.

It will be noted that the indicator stem 43, which is sealed off by O-ring 47 slides upwardly through the closure plug 33 from its lowered position to its elevated position of FIG. 5 indicating that the valve has delivered its metered quantity of lubricant to the bearing to which it is connected. The piston 42 and the indicating stem 43 remain in the elevated position so long as the lubricant system is maintained under pressure by the pump 3. As previously described, the pressure surge is maintained until all of the metering valves 7 of the system have been actuated to deliver the quantity of lubricant according to their capacity.

At this point excess pressure builds up in the system causing the pressure responsive switch 10 (FIG. 1) to trip and cause opening of the bypass or pressure relief valve 11 at which point the pressure in the system drops to zero.

As the lubricant in the system drops to zero, the check valve piston 41 shifts downwardly from the position of FIG. 5 to the position of FIG. 3 under the influence of the check valve spring 64. The check valve piston 41 thus blocks the lateral port 49 (FIG. 3) and at the same time opens the opposite lateral port 55 of the check valve cylinder so as to establish communication by way of the longitudinal transfer passageway 53 to the metering chamber 54 above the piston. At this point, the main discharge piston 42 shifts downwardly under the influence of the previously compressed spring 45. During the downward motion of piston 42, the lubricant below the piston flows as indicated in FIG. 3 downwardly through the passageway 62 of the valve sleeve and through the valve sleeve to the open valve port 55 and upwardly through the longitudinal transfer passageway 53 to recharge the metering chamber 54 above the piston 42. It will be understood that the check valve piston 41 is seated against the end of the tubular inlet screw 50, acting as a one-way valve to prevent back flow of lubricant into the system (which is at zero pressure) during recharging operation. Piston 42 continues its downward movement until its lower surface engages the retainer pin 40 (FIG. 3). The components of the valve remains in the position shown in FIG. 3 so long as the lubrication system is at zero pressure.

STROKE MODIFICATION

The valve shown in fragmentary form in FIG. 10 is in all respects a duplicate of the valve shown in FIGS. 3 - 5 except that a collar or sleeve 59 is interposed between the upper end of the main piston spring 45 and the washer 37 of closure plug 33.

It will be noted in FIGS. 3 - 5 that the piston stroke may represent the distance of travel of the lower surface of the piston shown in FIG. 3 (resting upon the retainer pin 40) to the position of FIG. 5, at which the main spring 45 is compressed to its solid length. With the sleeve 59 in position therefore, the amplitude of the stroke is reduced by the length of the collar 59, or (in the example illustrated) approximately one-half the stroke shown in FIG. 5. As a consequence, the output capacity of the metering chamber is correspondingly reduced. It will be understood that the length of the collar may be increased or decreased to modify the stroke as required.

The advantage of this type of adjustment arises from the fact that the compensating sleeve or collar 59 is confined within the valve and cannot be tampered with after the proper collar has been selected for a given bearing. It will also be noted that the collar may be interposed between the lower end of the spring and the piston if desired instead of at the upper end as shown.

MODIFIED VALVE STRUCTURE

The metering valve disclosed in FIGS. 11 and 12 is drawn to the same scale as FIGS. 3 - 5 but represents a smaller size with a reduced output. In other words, the diameter of the valve body (which may be hexagonal) is substantially smaller than the structure previously described and the diameter and stroke of the piston is correspondingly smaller to reduce the output capacity of the valve.

As shown in FIGS. 11 and 12, the valve body 30, except for size, is similar to that previously described and its lower end portion includes a male fitting 34 which is threaded into the manifold 18 of a centralized lubrication system as described earlier. The valve body includes a longitudinal bore 31, the upper end portion of which includes a closure plug 33 sealing off the open end of the bore by means of the washer 32. The valve body, immediately below the plug 33 is provided with a lateral outlet bore 58 into which is threaded a fitting 57 connected to the high pressure output line 26, which represents one of the branch lines of the lubrication system. The lower end of the bore 31 delineates the shoulder 36 previously described and also includes a tubular inlet screw 50 threaded in place which communicates with the manifold 18. The upper end of the inlet screw 50 is flush with the shoulders 36.

In the present example, the bore 31 of the valve body is provided with a one-piece cylinder sleeve 65 which comprises both the main cylinder, previously indicated at 35 and also the check valve cylinder previously indicated at 38. The cylinder 65 establishes a light press fit with the bore 31 and its upper end is engaged by a washer 37 seated against plug 33, while its lower end seats against the shoulder 36 of the valve body. The cylinder 65 also includes the retainer pin 40 acting as a stop for main piston 42 having a compression spring 45 surrounding the indicator stem 43 as previously described.

A check piston 41 is slidably confined in the lower portion of cylinder sleeve 65 and its lower end seats against the tubular inlet screw 50. The check piston 41 includes a check spring 64, the upper end of which seats against the retainer pin 40. The lower portion of cylinder 65 includes a check transfer passageway 60, similar to that described previously, leading from the check piston to the pressure chamber 63 beneath the main discharge piston 42. A metering transfer passageway 53 includes lateral ports at opposite ends providing communication between the pressure chamber 63 and metering chamber 54.

The operation of the metering valve as shown in FIGS. 11 and 12 is similar to that previously disclosed. Thus as shown in FIG. 11, the main piston 42 has been forced downwardly by its spring 45 to transfer lubricant from the pressure chamber 63 below the piston to the metering chamber 54 above the piston by way of the metering transfer passageway 53. The flow of lubricant is indicated by the arrows. In the position of FIG. 12, the check piston 41 is forced upwardly by lubricant pressure, (pressure chamber 63) such that the lubricant flows by way of the check piston, so as to force the main piston 42 upwardly, as indicated. This operation, as noted previously, delivers the metered charge from the metering chamber 54 through the lateral port 58 to the branch line 26 as indicated by the arrow.

As noted, the output capacity of the modified valve arrangement is substantially smaller than the main structure of FIGS. 3 – 5. By way of example, the parts may be proportioned to provide a piston stroke of approximately three-sixteenths of an inch, with a maximum discharge capacity of 0.005 cu. inch. Valves of other capacities may also be constructed according to the above with appropriate alterations to provide the desired output capacity.

EXTERNAL STROKE MODIFICATION

The modified structure shown in FIGS. 14 and 15 provides external adjustment of the main piston stroke in order to regulate the output capacity of the valve. As shown in part in FIG. 14, the upper end of the valve body 30 includes the closure plug 33 through which the indicating stem 43 of piston 42 passes. The stem includes the compression spring 45 for urging the piston downwardly.

The adjusting device comprises an externally threaded thimble 66 threaded into an internal bore of closure plug 33, the upper end of the thimble being closed and having a slot 67 for screw-driver engagement. The internal bore 68 of thimble 66 slidably fits the indicating stem 43 and the closed upper end of bore 68 provides a stop engageable with the closed upper end of the stem. The thimble may include a longitudinal slot 69 through which the action of the stem may be visually inspected.

The thimble 66 is adjusted by rotating it so as to raise or lower the closed upper end of the thimble with reference to the upper end of the indicating stem 43. The thimble is held in its adjusted position by a lock nut 70 threaded upon it and engaging the top of the closure plug.

The piston 42 and its indicating stem 43 are shown in the lowered position in FIG. 14. At the limit for which the thimble is adjusted, the upper end of stem 43 engages the upper end of bore 68 so as to limit the upward stroke of the piston. This regulates the volumetric output of the valve. The adjustment device permits the valve (either form) to be adjusted to inject the desired quantity of lubricant and may be utilized in place of the internal adjustment collar 59 previously described with reference to FIG. 10.

SLEEVELESS METERING VALVE

The metering valve shown in FIGS. 16 and 17 is similar to the several forms described earlier except that the cylinder sleeve 35 and check valve sleeve 38 (FIGS. 3 – 6) have been omitted. The one-piece sleeve 65 (FIGS. 11 – 13) has also been omitted; instead, the main piston 42 and the check piston 41 are fitted directly into suitable bores machined in the valve body or barrel 30. It will be noted that the main cylinder bore indicated at 71, in which the main discharge piston 42 is fitted, is located on the central axis of the valve body 30, while the axis of the check cylinder bore 72 is machined on an axis displaced laterally with respect to the axis of main cylinder bore 71.

In the modified arrangement, the metering transfer passageway 53 is drilled longitudinally through the valve body 30 along an axis parallel with the main cylinder bore 71 but spaced inwardly from it. The upper end of the valve body 30 is sealed off by a closure plug 33 as previously described, including an O-ring 47 which establishes a seal with the indicator stem 43. The lower end of the valve body includes a male pipe fitting 34, as previously described and the fitting includes a tubular inlet screw 50 which provides a seat for the check piston 41. The threaded bore for the inlet screw 50 is located on the central axis of the check cylinder bore 72.

The upper end of the check bore 72 provides a seat 73 for the check spring 64, and the lower end of the spring urges the check piston 41 into engagement with the inlet screw 50 to provide the one-way valve operation. The main piston 42 includes the compression spring 45 seated between the closure plug 33 and the top of the discharge piston 42. The upper end of the valve body 30 is further provided with the lateral port 58 through which the metered lubricant is forced to the bearing during operation of the valve.

It will be noted that the lower portion of the valve body 30 includes a check transfer passageway 60 which leads to the pressure chamber 63 beneath the main piston 42. The metering transfer passageway is formed by a counterbore drilled into the valve body concentric with the main cylinder 71 during the machining operation. In addition, the lower end of the valve body includes a slant bore 74 which is drilled from the lower end of the male pipe fitting 34, continuing across the check cylinder bore 72 to intersect the longitudinal metering transfer passageway 53. In the present example, the main piston 42 is provided with a circumferential groove into which is seated an O-ring 75 providing a seal with respect to the cylinder bore 71.

During operation of the valve, the pressure surge in the lubrication system passes through the bore of inlet screw 50 and unseats the check piston 41 so as to move the check piston upwardly (FIG. 17). Upward movement of the check piston thus opens the check transfer passageway 60, permitting the lubricant to enter the pressure chamber 63 beneath the piston 42 thus forcing the piston upwardly so as to force the lubricant from the metering chamber 54 above the piston and outwardly through the port 58 to the bearing. During this operation, the slant bore 74 is blocked by the check piston to prevent lubricant from being forced upwardly through the longitudinal metering transfer passageway 53, as shown.

When the lubrication system returns to normal or zero pressure, the check piston 41 returns to its closed position (FIG. 16) to block the slant bore 74 and metering transfer passageway 53. As spring 45 forces piston 42 downwardly, the lubricant in the pressure chamber 63 below piston 42 recharges the metering chamber 54 by forcing the lubricant upwardly through the slant bore 74 to the longitudinal passageway 53 and by way of lateral port 76 to the metering chamber 54.

It will be noted that the lateral port 76 is concentric with the lateral outlet 58, so that port 76 may be drilled. The modification shown in FIG. 16 permits the several bores and passageways to be machined directly into the valve body, thus eliminating the main cylinder sleeve insert and valve cylinder sleeve insert to reduce the cost of production.

Having described my invention, I claim:

1. A metering valve for a centralized lubrication system, said metering valve being adapted to eject a metered amount of lubricant in response to a lubricant pressure surge from the lubrication system, comprising
   a valve body having a main bore therein, the longitudinal bore having an inlet port interconnectable with the lubrication system and an outlet port through which the lubricant is ejected,
   a check valve located to cooperate with the inlet port of the main bore,
   first spring means biasing said check valve closed except when said check valve is exposed to a lubricant pressure surge,
   a main discharge piston slidably confined in the main bore between said check valve and the outlet port,
   second spring means biasing said discharge piston toward said check valve except when said dicant pressure surge,
   said check valve, discharge piston and main bore being arranged to define a pressure chamber between one side of said discharge pistion and said check valve and a metering chamber between the other side of said discharge piston and the outlet port,
   a check transfer passageway extending from said check valve to the pressure chamber, said check passageway being arranged with said check valve to allow flow of lubricant to the pressure chamber only when said check valve is opened in response to a lubricant pressure surge, the injection of lubricant from the lubrication system into the pressure chamber forcing said discharge piston away from said check valve and causing said discharge piston to deliver lubricant from the metering chamber through the outlet port, thereby ejecting a metered amount of lubricant, and
   a metering transfer passageway extending from said check valve to the metering chamber, said metering passageway being arranged with said check valve to allow flow of lubricant from the pressure chamber to the metering chamber only when said check valve is closed in response to the lack of a lubricant pressure surge, said second spring means forcing said discharge piston toward said check valve when said check valve is closed and causing said discharge piston to deliver lubricant from the pressure chamber through the metering transfer passageway to the metering chamber, thereby charging the metering chamber with a metered amount of lubricant.

2. A metering valve as set forth in claim 1 including
   a main cylinder sleeve fitted into the main bore, said main discharge piston being slidably confined in said main cylinder sleeve, and
   a slot formed in the main bore, said slot having an open side sealed off by said main cylinder sleeve to delineate said metering transfer passageway.

3. A metering valve as set forth in claim 1 including
   a check cylinder sleeve fitted into the main bore adjacent the inlet port,
   a check piston slidably confined in said check cylinder sleeve, and
   an external slot having lateral ports at opposite ends thereof formed in said check cylinder sleeve, the external slot having an open side sealed off by the main bore into which it is fitted, and the external slot and lateral ports delineating the check transfer passageway.

4. A metering valve as set forth in claim 2 including
   a check cylinder sleeve fitted into said main cylinder sleeve adjacent the inlet port,
   a check piston slidably confined in said check cylinder sleeve, and
   an external slot having lateral ports at opposite ends thereof formed in said check cylinder sleeve, the external slot having an open side sealed off by the main bore into which it is fitted, and the external slot and lateral ports delineating the check transfer passageway.

5. A metering valve as set forth in claim 1 including
   a closure member disposed at an open end of the main bore and sealing that open end, said closure member having a guide bore therethrough,
   an indicator stem fixed to said discharge piston, said indicator stem being slidably carried in the guide bore, and
   wherein said second spring means is in the form of a coil spring fitted about said indicator stem and disposed in compression between said closure member and said discharge piston.

6. A metering valve as set forth in claim 1 including
   a closure member disposed at an open end of the main bore and sealing that open end, said closure member having a guide bore therethrough,
   an indicator stem fixed to said discharge piston, said indicator stem being slidably carried in the guide bore, and
   adjustable stop means adapted to cooperate with said discharge piston for limiting the stroke of said discharge piston and, thereby, allowing the metered amount of lubricant ejected by said metering valve to be regulated as desired by the user.

7. A metering valve as set forth in claim 6 wherein said adjustable stop means includes
   a stop collar slidably confined on said indicator stem within the main bore, said stop collar being interchangeable with another of a different thickness through selective removal and replacement of said closure member.

8. A metering valve as set forth in claim 6 wherein said adjustable stop means includes
   a stop external to said valve body and engageable with the upper end of said indicator stem, said stop being manually adjustable relative to said valve body from outside said valve body.

9. A metering valve as set forth in claim 8 wherein said external stop includes
   an adjusting nipple threaded into said closure member, said nipple having a bore therethrough to receive said indicator stem and having a closed upper end that provides a stop engageable with the top end of said indicator stem, the stroke of said discharge piston being regulated by manually threading said nipple into and out of said closure member.

* * * * *

UNITED STATES PATENT OFFICE
CERTIFICATE OF CORRECTION

Patent No. 3,664,462                Dated May 23, 1972

Inventor(s) William O. Smith, Sr.

It is certified that error appears in the above-identified patent and that said Letters Patent are hereby corrected as shown below:

Column 11, Line 38 (Claim 1)

Delete the seventh word "dicant" and insert in its place ---discharge piston is exposed to a lubricant---.

Signed and sealed this 21st day of November 1972.

(SEAL)
Attest:

EDWARD M. FLETCHER, JR.            ROBERT GOTTSCHALK
Attesting Officer                  Commissioner of Patents